United States Patent [19]

Tanaka

[11] Patent Number: 4,516,403
[45] Date of Patent: May 14, 1985

[54] WASTE HEAT RECOVERY SYSTEM FOR AN INTERNAL COMBUSTION ENGINE

[75] Inventor: Yoshiharu Tanaka, Machida, Japan

[73] Assignee: Mitsui Engineering & Shipbuilding Co., Ltd., Tokyo, Japan

[21] Appl. No.: 602,563

[22] Filed: Apr. 20, 1984

[30] Foreign Application Priority Data

Oct. 21, 1983 [JP] Japan .................. 58-196200

[51] Int. Cl.³ ......................................... F22D 5/00
[52] U.S. Cl. ........................................ 60/667; 60/662; 60/677
[58] Field of Search ............... 60/618, 39.182, 660, 60/662, 665, 667, 670, 677

[56] References Cited

U.S. PATENT DOCUMENTS

| | | | |
|---|---|---|---|
| 2,900,793 | 8/1959 | Buri | 60/667 |
| 4,214,450 | 7/1980 | Nagashima et al. | 60/670 X |
| 4,394,813 | 7/1983 | Tanaka et al. | 60/39.182 X |

Primary Examiner—Stephen F. Husar
Attorney, Agent, or Firm—Armstrong, Nikaido, Marmelstein & Kubovcik

[57] ABSTRACT

A feed water supply pump and a second control valve are provided in a water supply line system and a first control valve is provided at a second steam line. Further, a third control valve is provided at a hot water supply line. In this manner, the terminal temperature difference between the circulating water and the exhaust gas at the inlet and outlet of a preheating portion of an exhaust gas economizer are so controlled as to become equal. In addition, steam discharged from an exhaust outlet of a multi-pressure steam turbine is turned to water by means of a condenser and then, the condensed water is returned to a drain tank while withdrawing and collecting heat energy respectively in a lubricating oil cooler, a fresh water cooler and an air cooler of an internal combustion engine.

3 Claims, 8 Drawing Figures

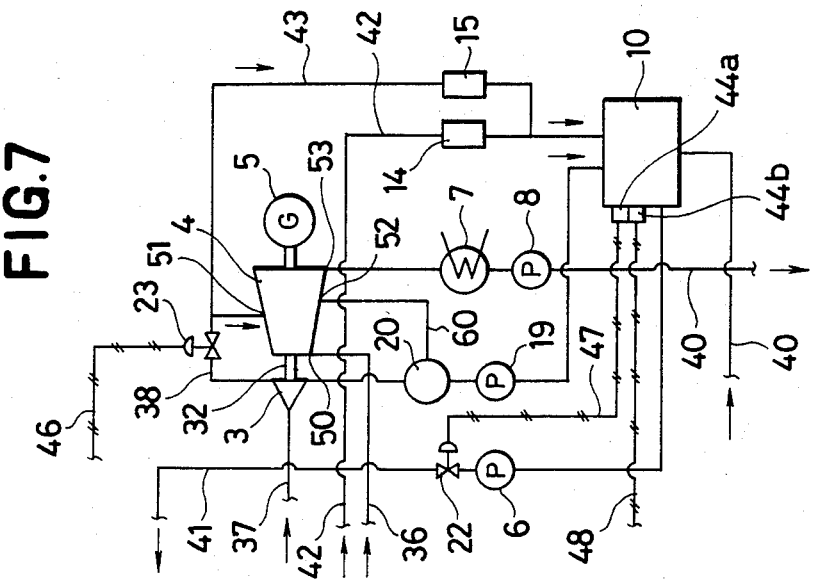
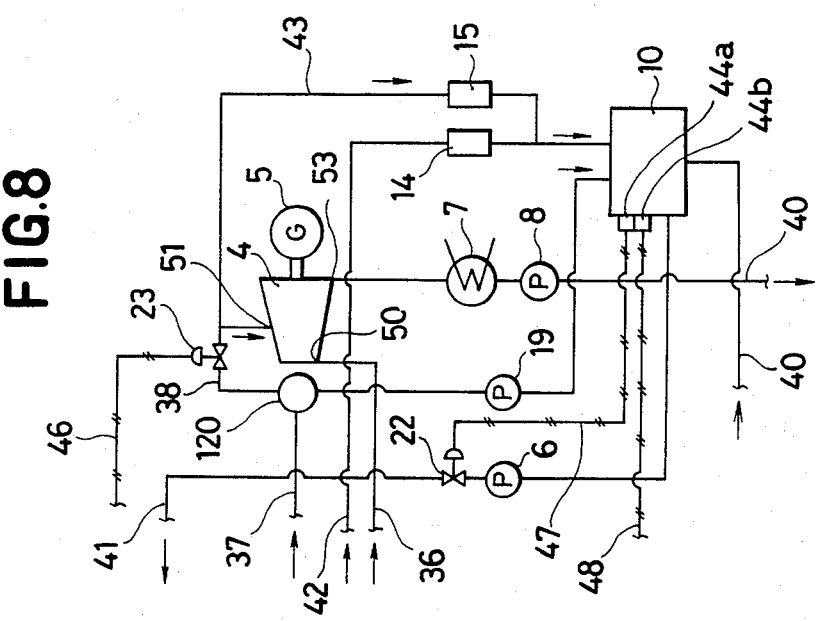

WASTE HEAT RECOVERY SYSTEM FOR AN INTERNAL COMBUSTION ENGINE

BACKGROUND OF THE INVENTION

The present invention relates to a waste heat recovery system for withdrawing and collecting heat energy within exhaust gases from an internal combustion engine such as a marine diesel engine and the like.

Heretofore, a wide variety of waste heat recovery systems have been proposed to turn heat energy within exhaust gases discharged from an internal combustion engine into electric power. However, upon withdrawing and collecting the heat energy within the exhaust gases, there is a limit to increase in the rate of heat recovery.

SUMMARY OF THE INVENTION

In view of the foregoing, the present invention has for its purpose to increase the rate of heat recovery in an overall waste heat recovery system.

In order to achieve this object, the construction of the waste heat recovery system according to the present invention is fundamentally as follows:

Namely, the waste heat recovery system comprises:

(a) an exhaust gas economizer having a preheating portion, evaporating portion and superheating portion;

(b) a multi-pressure steam turbine driving a generator;

(c) a steam separating drum and a first steam line supplying steam within the steam separating drum to a high pressure inlet of said multi-pressure steam turbine through the superheating portion of the exhaust gas economizer;

(d) a hot water flash turbine connected to said multi-pressure steam turbine;

(e) a hot water supply line supplying hot water in the steam separating drum to said hot water flash turbine;

(f) a second steam line supplying steam separated in said hot water flash turbine to low pressure inlet of the multi-pressure steam turbine;

(g) a first return line returning the hot water separated in said hot water flash turbine to a drain tank;

(h) a second return line returning water condensed from the exhaust steam discharged from said multi-pressure steam turbine to said drain tank through a variety of coolers;

(i) a water supply line supplying the liquid in said drain tank to the preheating portion of the exhaust gas economizer;

(j) a first control valve provided at said second steam line and controlling a supply of the steam within the second steam line by sensing the temperature of circulating water at the inlet side of the preheating portion of the exhaust gas economizer;

(k) a feed water supply pump provided at said water supply line;

(l) a second control valve provided at said water supply line and controlling a supply of the water by sensing a water level in the drain tank; and (m) a third control valve provided at said hot water supply line and controlling a supply of the hot water by sensing the water level in the drain tank.

As hereinabove stated, the waste heat recovery system according to the present invention comprises the water supply line supplying the liquid in the drain tank to the preheating portion of the exhaust gas economizer, the first control valve provided at said second steam line and controlling the supply of the steam within the second steam line by sensing the temperature of the circulating water at the inlet of the preheating portion of the exhaust gas economizer, the feed water supply pump provided at said water supply line, the second control valve provided at said water supply line and controlling the supply of the water by sensing the water level in the drain tank and the third control valve provided at said hot water supply line and controlling the supply of the hot water by sensing the water level in the drain tank. In this manner, the terminal temperature differentials between the inlet and outlet of the preheating portion of the exhaust gas economizer can be made even (i.e., parallel temperature differentials can be maintained). The heat energy within the exhaust gases may therefore be withdrawn and collected to a full extent.

At the same time, according to the present invention, the heat may further be collected from a variety of coolers such as a lubricating oil cooler, a fresh water cooler, an air cooler and the like. Thus, the waste heat recovery system according to the present invention is capable of increasing the rate of the heat recovery as a whole.

On the other hand, the multi-pressure steam turbine is juxtaposed with the hot water flash turbine so as to drive the generator and supply a low pressure steam discharged from the hot water flash turbine to the low pressure portion of the multi-pressure turbine. In this manner, there is an advantage such that the plant efficiency may be increased and thereby, the electric power may greatly be generated.

These and other features and advantages of the present invention will be more clear from the following description with reference to the accompanying drawings.

BRIEF DESCRIPTION OF THE DRAWINGS

FIG. 7 and FIG. 8 are system diagrams partly showing principle parts of each of the other waste heat recovery systems according to the present invention.

DETAILED DESCRIPTION OF THE PREFERRED EMBODIMENTS

Figure 1:
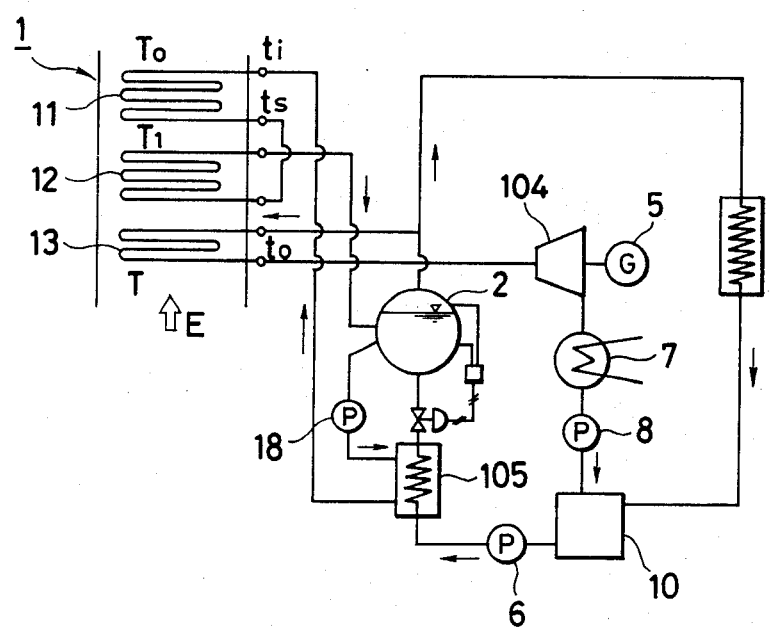
FIGS. 1, 2 and 3 are system diagrams of the prior art waste heat recovery systems.

In one conventional waste heat recovery system as shown in FIG. 1, steam within a steam separating drum 2 is supplied to a steam turbine 104 through a superheating portion 13 of the exhaust gas economizer 1 and a generator 5 is driven by this steam turbine 104, thereby turning heat energy within exhaust gases into electric energy. The exhaust steam discharged from the steam turbine 104 is turned to water by means of a condenser 7. Further, the condensed water is returned to a drain tank 10 by means of a condensing pump 8 and then supplied to said steam separating drum 2 by means of a feed water supply pump 6.

On the other hand, hot water in the steam separating drum 2 is circulated through a heat exchanger 105, a preheating portion 11 and an evaporating portion 12 of the exhaust gas economizer 1 and again returned to the steam separating drum 2 by means of a boiler water circulating pump 18.

Figure 4:
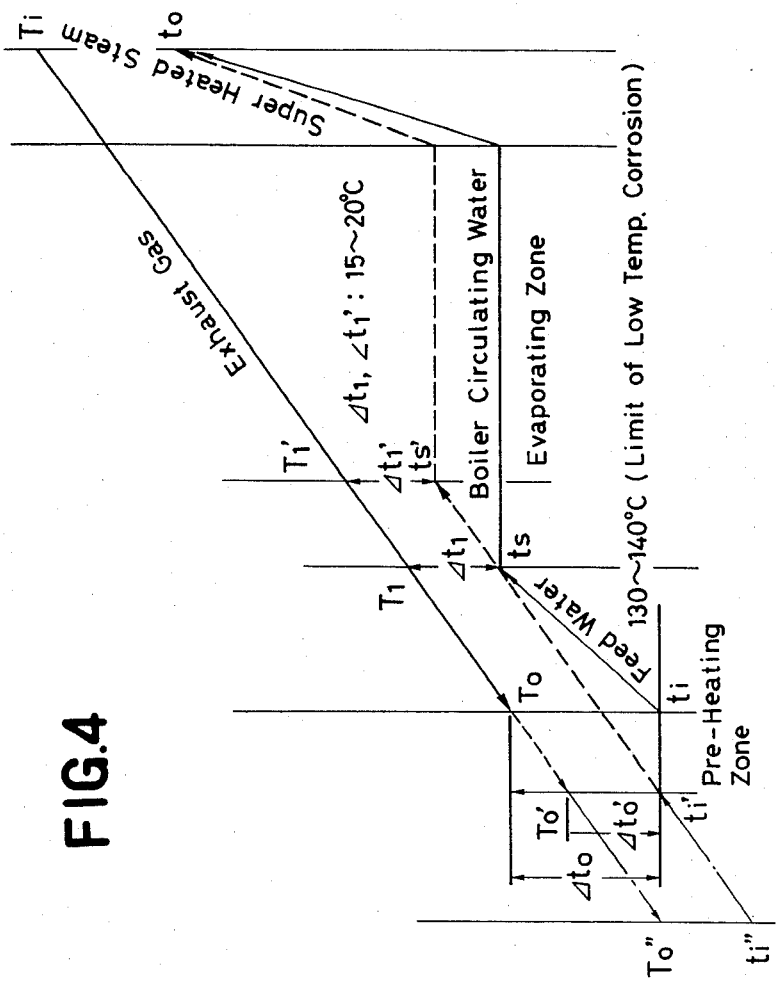
FIG. 4 is a graph illustrating temperature gradient in waste heat recovery systems.

In such waste heat recovery system, however, when the temperature of a circulating water at the inlet side of the preheating portion 11 of the exhaust gas economizer 1 is established to a fixed temperature $t_i$, the temperature of the exhaust gases at the outlet of the exhaust gas economizer 1 becomes $T_o$ due to the terminal temperature variation $\Delta t_l$ at the outlet side of the preheating portion 11 of the exhaust gas economizer 1. Accordingly, the heat may not sufficiently be withdrawn and collected from an exhaust gas E. (See FIG. 4)

Figure 2:
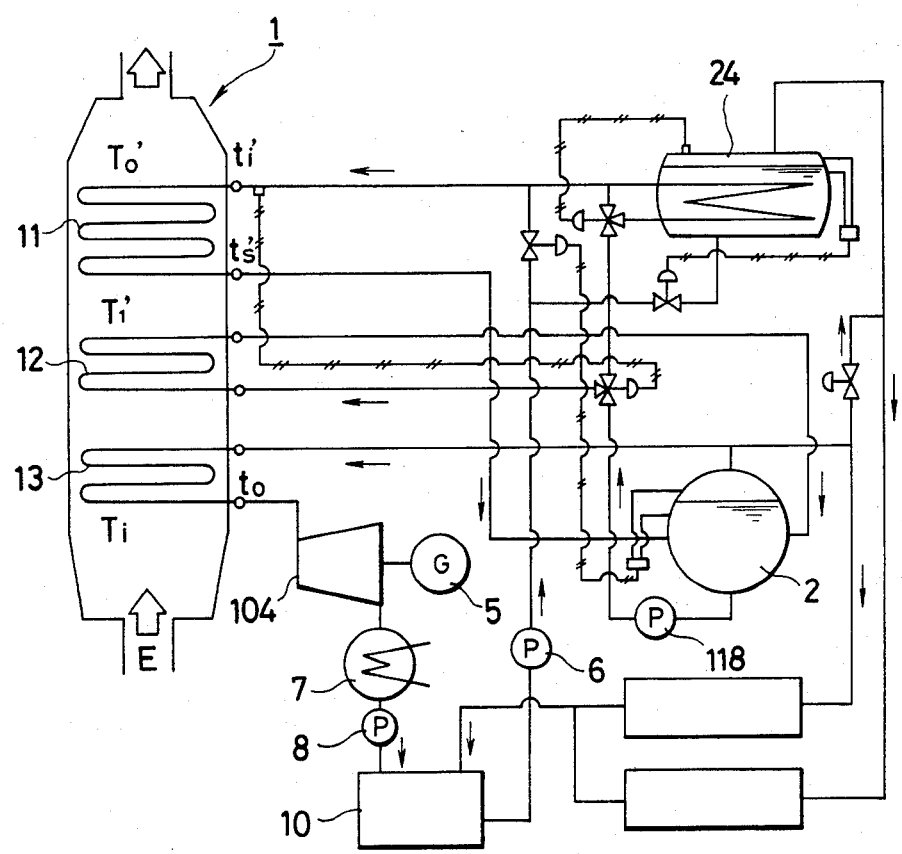
Figure 3:
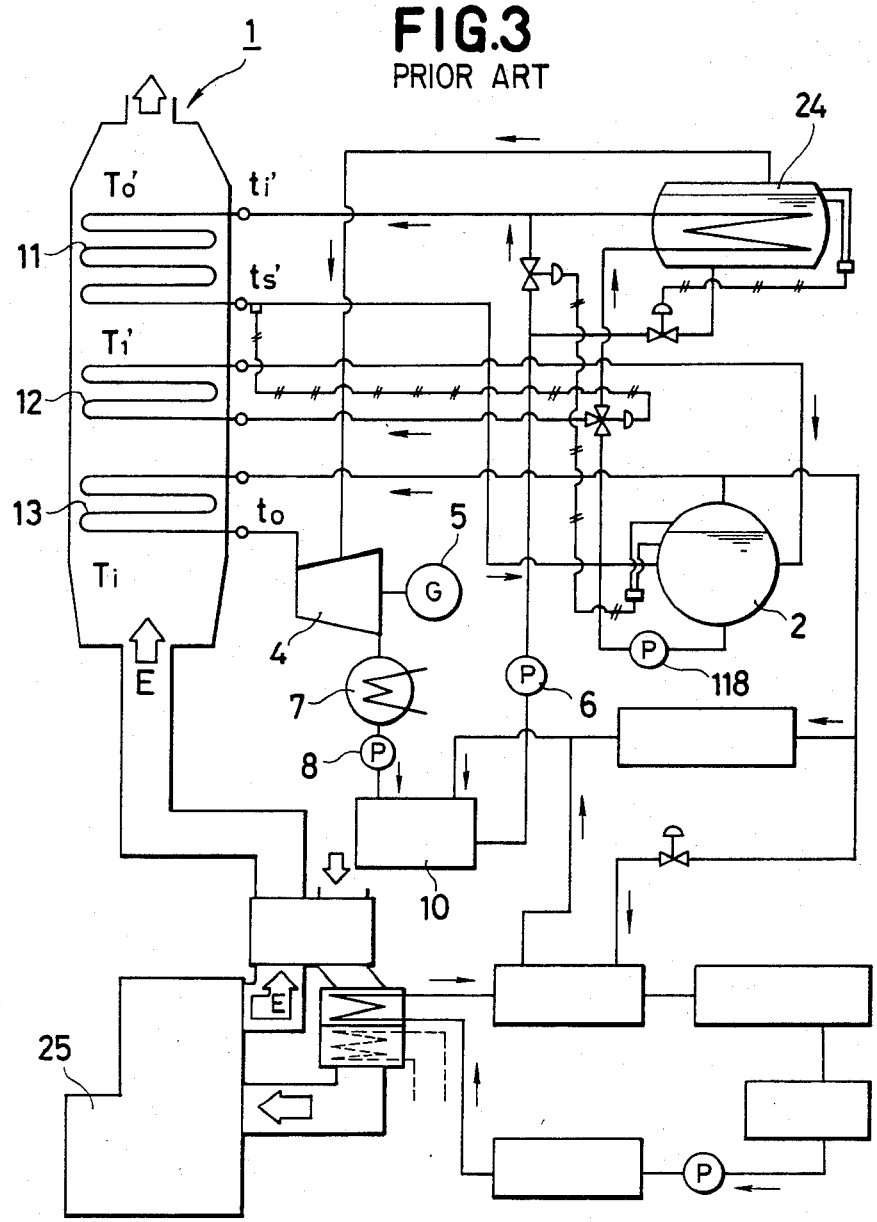

On the other hand, in waste heat recovery systems shown in FIGS. 2 and 3, the temperature of the circulating water is lowered by generating low pressure steam by means of a low pressure steam generator 24 whose heat source may be taken from part of the circulating water circulated by a pump 118, thereby controlling the temperature $t_i'$ at the inlet side of a circulating water at the preheating portion 11 of the exhaust gas economizer 1. In this case, however, due to the terminal temperature difference in the low pressure generator 24, the temperature $t_i'$ of the circulating water at the inlet side of the preheating portion 11 of the exhaust gas economizer 1, $T_o'$, is limited and the temperature $T_o'$ of the exhaust gas at the outlet side of the exhaust gas economizer 1 cannot be lowered sufficiently (FIG. 4), so that there is a limit to increase in the rate of heat recovery.

Figure 5:
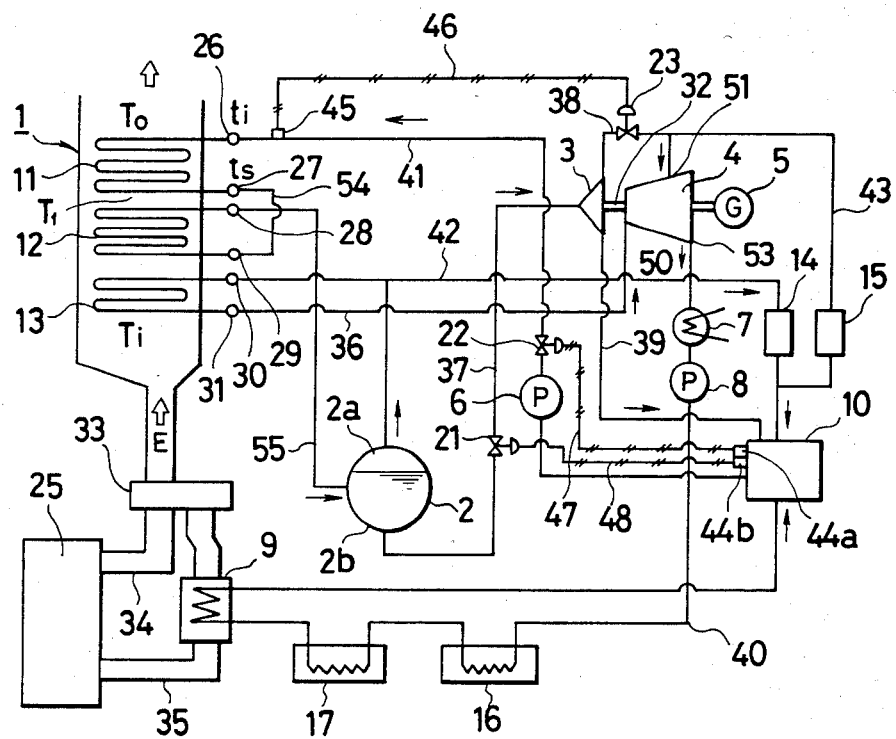
FIG. 5 and FIG. 6 are system diagrams of the waste heat recovery systems according to the present invention.

In view of the foregoing, in order to increase the rate of the heat recovery in the overall waste heat recovery system, one embodiment of the present invention is constructed as shown in FIG. 5, wherein like reference numerals designate like parts of the prior art waste heat recovery systems as shown in FIGS. 1 through 3.

An evaporating portion 2a of the steam separating drum 2 communicates with a high pressure inlet 50 of the multi-pressure turbine 4 by means of a first steam supply line 36 including a superheating portion 13 of the exhaust gas economizer 1. A large portion of the steam separated in the steam separating drum 2 is superheated in the superheating portion 13 of the exhaust gas economizer 1 and thereafter, supplied to the high pressure inlet 50 of the multi-pressure turbine 4. Normally, this steam separating drum 2 may also be used for a steam drum of an auxiliary boiler.

Shafts of each of said multi-pressure turbine 4 and a hot water flash turbine 3 may be linked with each other through connecting means 32. The generator 5 is driven by these turbines 3 and 4 whereby the heat energy is turned into the electric energy.

A hot water portion 2b of the steam separating drum 2 communicates with said hot water flash turbine 3 by means of the hot water supply line 37. The hot water stored in the steam separating drum 2 is supplied to said hot water flash turbine 3 through said hot water supply line 37.

Said hot water flash turbine 3 communicates with a low pressure inlet 51 of the multi-pressure turbine 4 by means of a second steam line 38. Part of the steam separated in the hot water flash turbine 3 is supplied to the low pressure inlet 51 of the multi-pressure turbine 4. Further, said hot water flash turbine 3 communicates with the drain tank 10 by means of a first return line 39. The hot water separated in said hot water flash turbine 3 is returned to the drain tank 10.

On the other hand, an exhaust outlet 53 of said multi-pressure turbine 4 communicates with the drain tank 10 by means of a second return line 40 including the condenser 7, the condensing pump 8, a lubricating oil cooler 16, a fresh water cooler 17 and an air cooler 9 in an internal combustion engine 25. The steam discharged from the exhaust outlet 53 of the multi-pressure turbine 4 is turned into water by the condenser 7. Then the condensed water is returned to said drain tank 10 while withdrawing and collecting the heat energy in each of the lubricating oil cooler 16, fresh water cooler 17 and air cooler 9 of the internal combustion engine 25.

Said drain tank 10 communicates with an inlet 26 of the preheating portion 11 of the exhaust gas economizer 1 by means of a water supply line 41 equipped with the feed water supply pump 6. Flow in this feed water supply pump 6 is preset so that the terminal temperature difference between the circulating water and the exhaust gas at the inlet and outlet of the preheating portion 11 of the exhaust gas economizer 1 become equal in normal operation thereof.

Furthermore, an outlet 27 of the preheating portion 11 of the exhaust gas economizer 1 communicates with an inlet 29 of the evaporating portion 12 of the exhaust gas economizer 1 by means of a communicating tube 54. In addition, an outlet 28 of the evaporating portion 12 of the exhaust gas economizer 1 communicates with the hot water portion 2b of the steam separating drum 2 by means of a communicating tube 55.

It is essential in the present invention that the feed water temperature $t_i$ is kept constant and the terminal temperature difference between the circulating water and the exhaust gas at the inlet and outlet of the preheating portion 11 of the exhaust gas economizer 1 are equal. For this purpose, a first control valve 23, second control valve 22 and third control valve 21 are provided as will be set forth hereinbelow.

Said first control valve 23 is provided at the second steam line 38. The feed water temperature at the inlet 26 of the preheating portion 11 of the exhaust gas economizer 1 may be sensed by a sensor 45. When the feed water temperature becomes higher than the preset temperature, steam flow within the second steam line 38 may be reduced by controlling the first control valve 23. On the contrary, when lower than the preset temperature, the steam flow within the second steam line 38 may be increased by controlling the same.

Further, the second control valve 22 is positioned at the downstream side of the feed water supply pump 6 and provided at the water supply line 41. Said control valve 22 controls the water level in the drain tank 10 through a detector 44a.

Still further, the third control valve 21 is provided at the hot water supply line 37. Said third control valve 21 controls the hot water supply through a detector 44b. Control valve 21, which is provided in hot water supply line 37 and is responsive to signals from a detector 44b for detecting the water level in drain tank 10, controls the flow rate of hot water through the hot water supply line 37.

In this connection, said sensor 45 and first control valve 23 are electrically connected by means of a lead wire 46. Further, the detector 44a, second control valve 22 are electrically connected by means of a lead wire 47, and the detector 44b and third control valve 21 are electrically connected to each other by means of a lead wire 48.

A first branch tube 42 branching off said first steam line 36 communicates with the drain tank 10 through high temperature heating services 14, whereas a second branch tube 43 branching off said second steam line 38 communicates with the drain tank 10 through low temperature heating services 15.

On the other hand, the internal combustion engine 25 includes an exhaust manifold 34 and an intake manifold 35. These manifolds 34 and 35 communicate with a turbo-charger 33. Additionally, the exhaust manifold 34 communicates with the exhaust gas economizer 1.

Figure 6:
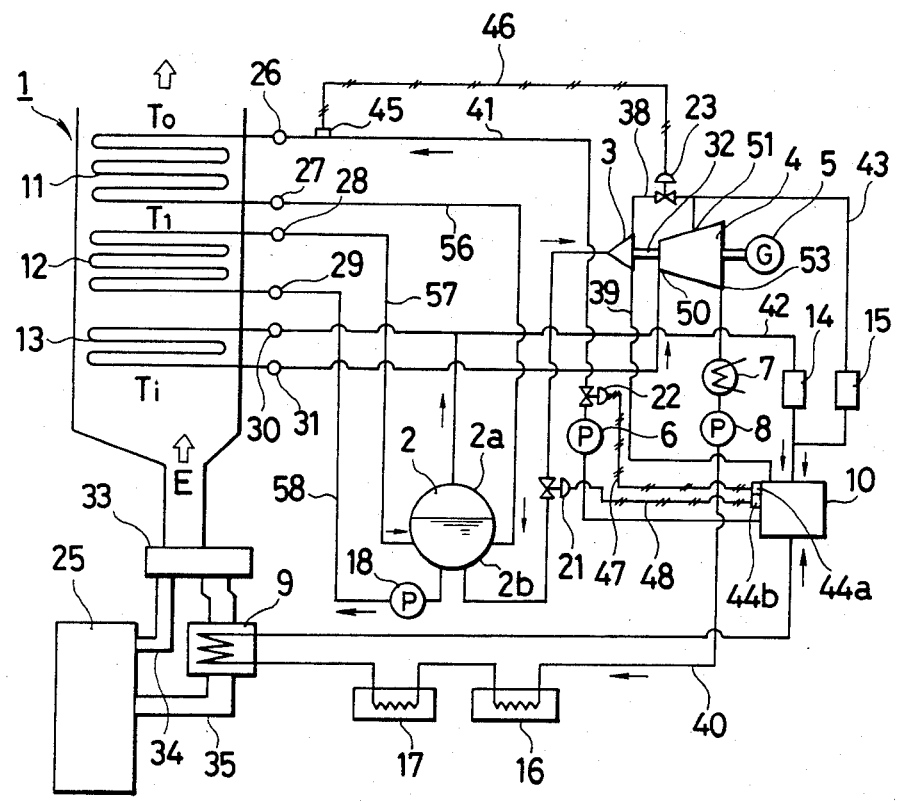

FIG. 6 illustrates a second embodiment of the present invention. The evaporating portion 12 of the exhaust gas economizer 1 constitutes an independent circulating system by itself. The other construction thereof is the same as the first embodiment as shown in FIG. 5.

Namely, the inlet 29 of the evaporating portion 12 of the exhaust gas economizer 1 communicates with the hot water portion 2b of the steam separating drum 2 by means of a line 58 having the circulating pump 18 and further, the outlet 28 of the evaporating portion 12 communicates with the hot water portion 2b of the steam separating drum 2 by means of a line 57. Still further, the outlet 27 of the preheating portion 11 of the exhaust gas economizer 1 communicates with the hot water portion 2b of the steam separating drum 2 by means of a line 56.

FIG. 7 illustrates a third embodiment of the present invention. In this example, a flasher 20 is provided at the first return line 39 whereby the steam separated therein is supplied to a second low pressure inlet 52 of the multi-pressure turbine 4 through a third steam line 60 separate liquid is discharged to the drain tank 10 by means of a transfer pump 19.

In the above-mentioned first, second and third embodiments, as shown in FIG. 8, the flasher may be employed in place of the hot water flash turbine 3.

This flasher 120 is positioned adjacent the multi-pressure turbine 4. Said flasher 120 communicates with the steam separating drum 2, the multi-pressure turbine 4 and the drain tank 10 by means respectively of the first steam supply line 37, the second steam supply line 38 and the first return line 39.

I claim:
1. In a waste heat recovery system comprising
(a) an exhaust gas economizer having a preheating portion, an evaporating portion and superheating portion, (b) a multi-pressure steam turbine driving generator, (c) a steam separating drum and a first steam line supplying steam within the steam separating drum to a high pressure portion through the superheating portion of the exhaust gas economizer, said waste heat recovery system comprises:

(c) a steam separating drum and a first steam line supplying steam within the steam separating drum to a high pressure inlet of said multi-pressure steam turbine through the superheating portion of the exhaust gas economizer;
(d) a hot water flash turbine connected to said multi-pressure steam turbine;
(e) a hot water supply line supplying hot water in the steam separating drum to said hot water flash turbine;
(f) a second steam line supplying steam separated in said hot water flash turbine to a low pressure inlet of the multi-pressure steam turbine;
(g) a first return line returning the hot water separated in said hot water flash turbine to a drain tank;
(h) a second return line returning water condensed from the exhaust steam discharged from said multi-pressure steam turbine to said drain tank through a variety of coolers;
(i) a water supply line supplying the liquid in said drain tank to the preheating portion of the exhaust gas economizer;
(j) a first control valve provided at said second steam line and controlling a supply of the steam within the second steam line by sensing the temperature of circulating water at the inlet side of the preheating portion of the exhaust gas economizer;
(k) a feed water supply pump provided at said water supply line;
(l) a second control valve provided at said water supply line and controlling a supply of the water by sensing a water level in the drain tank; and
(m) a third control valve provided at said hot water supply line and controlling a supply of the hot water by sensing the water level in the drain tank.

2. A waste heat recovery system according to claim 1, wherein a flasher is provided at the first return line, said flasher communicating with the low pressure portion of the multi-pressure turbine by means of the stream supply line.

3. A waste heat recovery system according to claim 1, wherein a flasher is provided adjacent the multi-pressure turbine, said flasher communicating with the steam separation drum, a first low pressure inlet of the multi-pressure steam turbine and the drain tank by means respectively of the first steam line, second steam line and first return line.

* * * * *